Oct. 31, 19   3,701,583
ACOUSTO-OPTICAL FILTER HAVING SCANNED ACOUSTIC FREQUENCY COMPENSATED BY CONTROLLED DISTRIBUTED BIREFRINGENCE
Filed Dec. 14, 1970

INVENTOR
DONALD L. HAMMOND
BY Roland D. Griffin
ATTORNEY

United States Patent Office 3,701,583
Patented Oct. 31, 1972

3,701,583
ACOUSTO-OPTICAL FILTER HAVING SCANNED ACOUSTIC FREQUENCY COMPENSATED BY CONTROLLED DISTRIBUTED BIREFRINGENCE
Donald L. Hammond, Los Altos Hills, Calif., assignor to Hewlett-Packard Company, Palo Alto, Calif.
Filed Dec. 14, 1970, Ser. No. 97,523
Int. Cl. G02f 1/24
U.S. Cl. 350—149                12 Claims

ABSTRACT OF THE DISCLOSURE

An electronically tunable acousto-optic filter is scanned over a wide range of optical frequencies by varying the acoustic frequency and is provided with means for controllably varying the birefringence of the filter medium along the length thereof to compensate for acoustic $k$ vector distribution, thereby increasing the rate at which the filter may be scanned.

BACKGROUND OF THE INVENTION

Electronically tunable acousto-optical filters have been constructed wherein light of a first polarization traveling collinearly with an acoustical wave through an optically anisotropic medium, such as a birefringent crystal, is diffracted off the acoustical wave from the first polarization into a second polarization. The light of the second polarization. The light of the second polarization may be separated from that of the first polarization at the output. The frequencies of the acoustic wave and the light are related such that the bandpass characteristics of the acousto-optic filter may be changed or tuned over a wide range of optical frequencies by varying the frequency of the acoustic wave. Such as acousto-optic filter is disclosed in an article titled "Acousto-Optic Tunable Filter" appearing in the Journal of the Optical Society of America, vol. 59, No. 6, of June 1969, pages 744–747, and in an article titled "Electronically Tunable Acousto-Optic Filter" appearing in the Applied Physics Letters, vol. 15, No. 10, of Nov. 15, 1969, pages 325 and 326.

The speed at which light may be scanned by varying the frequency of the applied acoustic wave is limited by the length of time that it takes for the acoustic wave to pass through the crystal, since the frequency of the acoustic wave must be substantially uniform throughout the medium to produce an optimum diffraction of the optical wave and since an acoustic wave travels through the medium relatively slowly, i.e., at a speed $10^5$ slower than the collinear optical wave.

For example, in a 10 cm. long lithium niobate crystal (LiNbO$_3$), it takes 20 $\mu$sec. for an acoustic wave to travel from the input end to the output end. Therefore, for optimum diffraction, a scan or change from one optical frequency to the next may not take place in less than 20 $\mu$sec., resulting in a relatively slow scan rate of two milliseconds per every one hundred resolvable elements.

SUMMARY OF THE INVENTION

In the present invention, a method and apparatus is provided for controllably varying the degree of birefringence along the length of the crystal in a manner which will just compensate for the change of the acoustic wavelength along the length of the crystal as the acoustic frequency is varied to scan the optical range. In this manner, the scan rate is substantially improved, for example by a factor of fifty.

In one embodiment of the invention, the degree of birefringence is controlled by an electro-optic effect produced along the length of the crystal by a voltage extending transverse to the optical wave path through the crystal. The extent of birefringence change may be controlled by varying the amplitude of the transverse voltage. The birefringence may also be controlled by controlled temperature and pressure gradients applied along the crystal.

DESCRIPTION OF THE EMBODIMENTS

Figure 1:
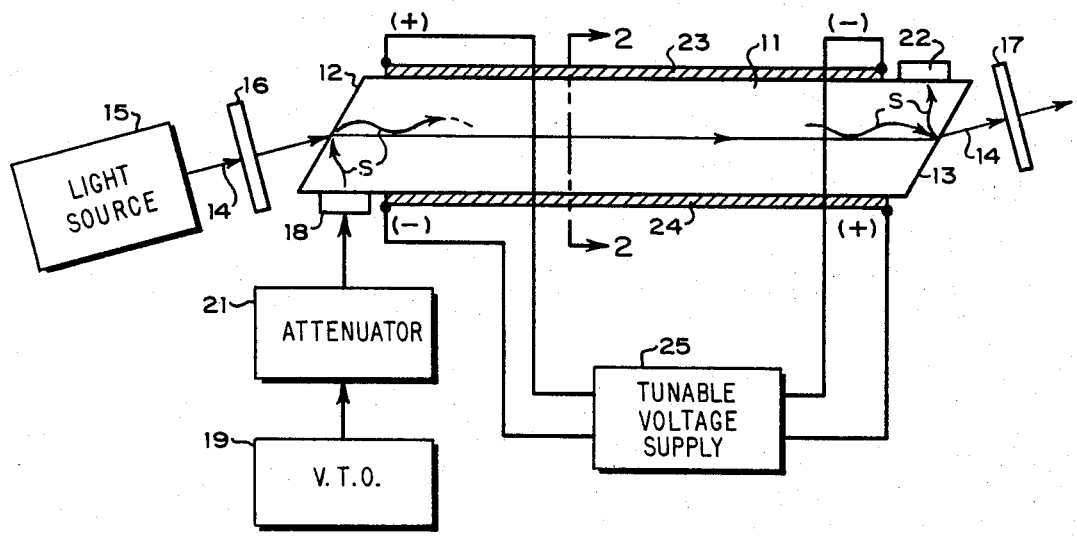
FIG. 1 is a schematic diagram of an acousto-optic filter according to one embodiment of the present invention.
Figure 2:
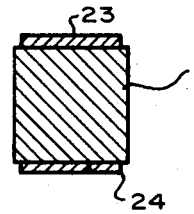
FIG. 2 is a cross-section view of the filter of FIG. 1 taken along section line 2—2.

Referring now to FIG. 1, one typical form of acousto-optic filter comprises a suitable anisotropic medium 11, for example, the birefringent crystal quartz, one centimeter square in transverse cross-section and ten centimeters in length provided with angled input and output end surfaces 12 and 13, respectively. The longitudinal axis of the main body 11 is hereafter referred to as the Y-axis, while the X-axis is perpendicular to the plane of the drawing and the Z-axis extends in the vertical direction relative to the drawing. Other crystals may be employed, for example, lithium niobate, lithium tantalate, or barium sodium niobate.

An optical beam 14 from source 15, for example, ultraviolet light in the case of a quartz body 11, is transmitted into the body 11 through the input surface 12, preferably cut at Brewster's angle to minimize transmission reflection losses, passes along the Y-axis of the body and exits through the output end 13. This light is polarized in a first direction along the Z-axis by the linear polarizer 16. To observe or otherwise utilize that portion of the light that is diffracted from the light beam by the acoustic wave, an output linear polarizer 17 with an axis of polarization along the X-axis is positioned in the path of the output beam and passes that light which is polarized orthogonally to the polarization of the input beam 14.

An acoustical transducer 18 is mounted in intimate contact with the crystal 11 and is connected to a suitable signal generator or source 19 such as a voltage tunable oscillator, the frequency of which can be varied by varying the input voltage thereto. The RF output of the voltage tunable oscillator 19 is fed via an adjustable attenuator 21 to the acoustic transducer 18 for generating a shear acoustic wave, S, which is internally reflected from the input face 12 of the crystal 11 and propagated collinearly with the input light beam along the Y-axis of the crystal 11.

For a particular combination of light wave and acoustic wave frequencies, there is found to be a strong interaction between the light and the acoustic wave in which the acoustic wave diffracts the light wave from the polarization orientation of the input beam into the orthogonal polarization. This yields a narrow bandpass of light waves of orthogonal polarization which are then separated from the input light waves by horizontal linear polarizer 17. This narrow bandpass of light waves is a function of the applied acoustical frequency and can therefore be varied in frequency by varying the frequency of excitation supplied by the voltage tunable oscillator 19. The acoustic shear wave S is reflected off the end face 13 and absorbed by acoustic absorber 22.

This collinear diffraction occurs as a cumulative effect for a very narrow band of light frequencies, and it is non-cumulative by incremental self-cancellation for other frequencies. The cumulative diffraction effect occurs when the momentum vectors of the incident light and acoustic wave satisfy the relation that their sum equals the momentum vector of the output light beam. This condition is called "phase matching." A narrow band of frequencies satisfying this relation and diffracted into the orthogonal polarization is then passed by the output analyzer 17 while the light of the initial polarization is blocked. If desired, the output polarizer 17 may be polarized in the Z direction to pass the non-diffracted light and block the diffracted light.

Diffraction into the orthogonal polarization occurs via the $p_{41}$ photoelastic constant, and is only cumulative if $|k_o|-|k_e|=|k_a|$, where the subscripts $o$, $e$ and $a$ denote the ordinary and extraordinary light waves and the acoustic wave, respectively. This will be the case if the light and acoustic frequencies $f_o$ and $f_a$ are related by:

$$f_o = \frac{cf_a}{v|\Delta\eta|} \quad \text{(Eq. 1)}$$

where $c/v$ is the ratio of the light velocity in vacuum to the acoustic velocity in the filter medium and $\Delta\eta$ is the birefringence of the crystal.

In a typical case of lithium niobate, the acousto-optic device 11 is tunable from 7,000 to 5,500 A. by changing the acoustic drive frequency from 750 to 1050 mHz. A bandpass of less than 2 A. is obtained for the output beam.

Figure 3:
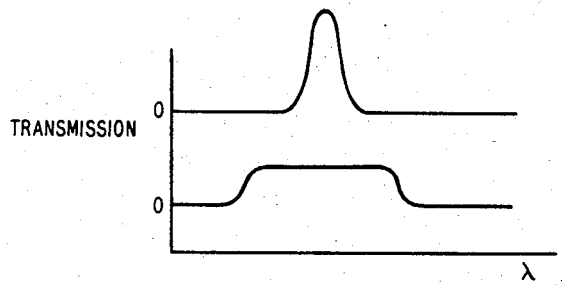
FIG. 3 is an illustrative plot of two different optical bandpasses in a crystal without birefringence compensation, one obtained with a normal scan rate and the other with a fast scan rate.

In this embodiment, where the crystal is ten (10) cm. long, it takes about 20 $\mu$sec. for an acoustical wave to travel from the input end to the output end. For optimum diffraction of the optical wave, the acoustic frequency $f_a$ should be uniform throughout the length of the crystal. Where the acoustic frequency is scanned too rapidly, an effect of the type illustrated in FIG. 3 occurs wherein the broadened bandpass and lower transmission percent resulting from the fast scan rate is illustrated in the lower trace, as opposed to the optimum transmission and narrow band width of the top trace obtained with a slow or normal scan rate.

To overcome this limitation on the rate of scan of the optical frequencies, means are provided for producing a controlled variation in the birefringence of the crystal along its length such that the variation in birefringence just balances or compensates for the instantaneous distribution of acoustic $k$ vectors along the length of the Y-axis. The degree of change in birefringence is varied in accordance with the degree of change in the acoustic $k$-vector magnitude; for a linear acoustic $k$-vector change, a linear birefringence distribution is employed.

In the embodiment of the invention shown in FIG. 1, a substantially linear change in birefringence along the length of the crystal is produced by an electro-optic effect created by a substantially linearly varying electric field directed along the Z-axis of the crystal. This field is produced by a pair of electrodes 23 and 24 positioned on opposite sides of the crystal spaced-apart along the Z-axis, the electrodes extending along substantially the full length of the crystal. The electrodes are made of a resistive material such as silicon or Nichrome, the resistance of which is substantially constant along the Y-axis. A voltage is applied to the electrodes from the tunable voltage supply 25 so as to produce a positive potential on electrode 23 at the input end of the crystal and a negative potential at the output end of the resistive electrode 23. The potentials on the electrode 24 are just the reverse of those on electrode 23 such that the input end is negative and the output end is positive. The potential difference across the crystal along the Z-axis is therefore maximum at the two ends, but reversed in sign and zero at the mid-point along the Y-axis.

The resultant linearly varying electro-optic effect produced along the Y-axis creates a linearly varying birefringence along the Y-axis compensating for the increasing acoustic $k$ vector along the length as the frequency of the acoustic wave is increased to scan the incoming optical frequency range.

Where the scan rate is relatively low, the change in birefringence may be small and the potential difference along the Z-axis at each end proportionately small. With increasing scan rate, the potential difference and birefringence variation must be relatively greater. An upper limit to this electro-optic control and thus to the scan rate is set, for example, by the breakdown voltage of the electric field in the Z direction.

Figure 4:
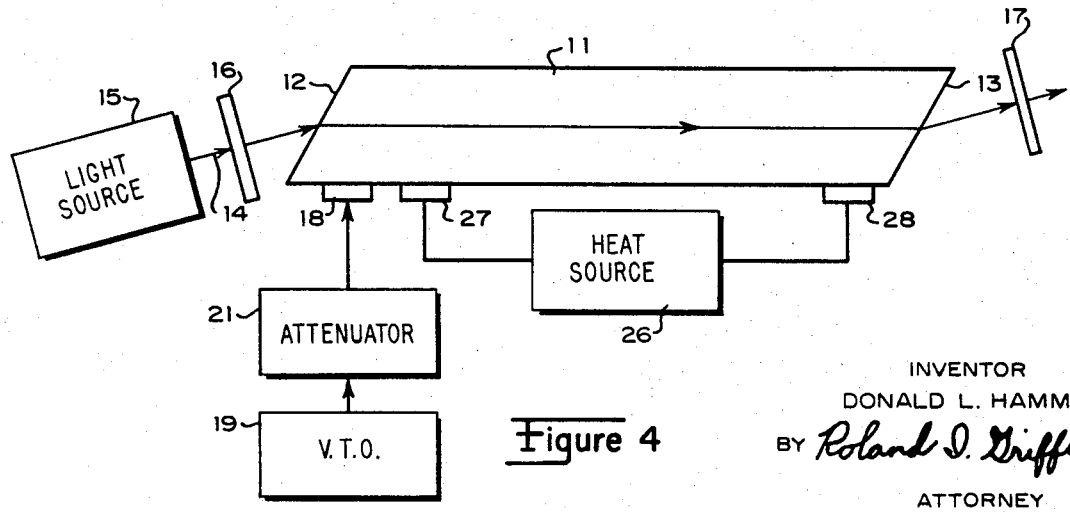
FIG. 4 is a schematic diagram of another embodiment of this invention.

Although a controllable electro-optic effect is employed in this preferred embodiment of the invention, the desired birefringence control may be effected by other means. For example, a controllable temperature gradient may be produced along the Y-axis of the crystal, heat being supplied to the crystal 11 by means of the controllable heat source 26 and heat source elements 27 and 28 coupled to the ends of the crystal 11 as shown in FIG. 4. The input end of the crystal is thereby maintained at a temperature different from that of the output end and with the temperature changing along the length therebetween in a controlled manner. The magnitude and sign of the temperature variation is chosen to provide the desired variation in birefringence along the Y-axis to compensate for the acoustic $k$ vector distribution.

In another embodiment, a controllable strain gradient set up along the length of the Y-axis by a changing pressure applied to the surfaces of the crystal produces the desired variable birefringence along the crystal for increased optical scan rates.

I claim:

1. A method for diffracting light from a first polarization to a second polarization, said method comprising the steps of passing light of the first polarization into an optically anisotropic birefringent medium, producing an acoustic wave in the anisotropic birefringent medium substantially collinear with the path of the light in the anisotropic birefringent medium, the light of the first polarization being diffracted on the acoustic wave in the anisotropic birefringent medium to shift the polarization of light in the anisotropic birefringent medium from the first polarization to the second polarization, scanning the diffracted light over a band of frequencies by varying the frequency of the acoustic wave, and changing the value of the birefringence of the anisotropic birefringent medium along the path of the light in the anisotropic birefringent medium to compensate for a distribution of acoustic $k$ vectors produced along this path by varying the frequency of the acoustic wave.

2. A method as in claim 1 including the step of separating light of one of said polarizations from light of the other of said polarizations.

3. A method as in claim 1 wherein the step of changing the value of the birefringence of the anisotropic birefringent medium comprises producing an electro-optic effect along the path of the light in the anisotropic birefringent medium.

4. A method as in claim 3 wherein said electro-optic effect is produced by a controllable electrical potential gradient established in the anisotropic birefringent medium transverse to the path of the light therein.

5. A method as in claim 1 wherein the step of changing the value of the birefringence of the anisotropic birefringent medium comprises producing a controllable strain gradient in the anisotropic birefringent medium along the path of the light therein.

6. A method as in claim 1 wherein the step of changing the value of the birefringence of the anisotropic birefringent medium comprises producing a controllable temperature gradient in the anisotropic birefringent medium along the path of the light therein.

7. Apparatus for diffracting light from a first polarization to a second polarization, said apparatus comprising means for passing light of the first polarization into an optically anisotropic birefringent medium, means for producing an acoustic wave in the anisotropic birefringent medium substantially collinear with the path of the light in the anisotropic birefringent medium, the light of the first polarization being diffracted on the acoustic wave in the anisotropic birefringent medium to shift the polarization of light in the anisotropic birefringent medium from the first polarization to the second polarization, means for scanning the diffracted light over a band of frequencies by varying the frequency of the acoustic wave, and means for changing the value of the birefringence of the anisotropic birefringent medium along the path of the light in the anisotropic birefringent medium to compensate for a distribution of acoustic $k$ vectors produced along this path by varying the frenquency of the acoustic wave.

8. Apparatus as in claim 7 including means for separating light of one of said polarizations from light of the other of said polarizations.

9. Apparatus as in claim 7 wherein the means for changing the value of the birefringence of the anistropic birefringent medium comprises means for producing an electro-optic effect along the path of the light in the anisotropic birefringent medium.

10. Apparatus as in claim 9 wherein the means for producing said electro-optic effect comprises means for producing a controllable electrical potential gradient in the anisotropic birefringent medium transverse to the path of the light therein.

11. Apparatus as in claim 10 wherein the means for producing a controllable electrical potential gradient comprises a pair of electrodes positioned on opposite sides of the anisotropic birefringent medium, and a potential source coupled to said electrodes.

12. Apparatus as in claim 7 wherein the means for changing the value of the birefringence of the anisotropic birefringent medium comprises means for producing a controllable temperature gradient in the anisotropic birefringent medium along the path of the light therein.

References Cited
UNITED STATES PATENTS

| | | | |
|---|---|---|---|
| 3,560,955 | 2/1971 | Hallman | 350—161 X |
| 3,330,956 | 7/1967 | Wade | 350—161 X |

OTHER REFERENCES

Harris et al.: "Acousto-Optic Turnable Filter," J.O.S.A., vol. 59, No. 6 (June 1969), pp. 744–747.

DAVID SCHONBERG, Primary Examiner

P. R. MILLER, Assistant Examiner

U.S. Cl. X.R.

350—150, 157, 161